(12) United States Patent
Tang

(10) Patent No.: US 11,153,806 B2
(45) Date of Patent: Oct. 19, 2021

(54) ACCESS CONTROL METHOD AND DEVICE, COMPUTER READABLE MEDIUM AND SYSTEM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/762,819

(22) PCT Filed: Apr. 4, 2018

(86) PCT No.: PCT/CN2018/081995
§ 371 (c)(1),
(2) Date: May 8, 2020

(87) PCT Pub. No.: WO2019/091044
PCT Pub. Date: May 16, 2019

(65) Prior Publication Data
US 2020/0367140 A1   Nov. 19, 2020

(30) Foreign Application Priority Data

Nov. 9, 2017   (WO) ................ PCT/CN2017/110292

(51) Int. Cl.
*H04W 76/27*   (2018.01)
*H04B 7/204*   (2006.01)
(Continued)

(52) U.S. Cl.
CPC .......... *H04W 48/02* (2013.01); *H04W 48/14* (2013.01); *H04W 76/25* (2018.02); *H04W 76/27* (2018.02); *H04W 84/042* (2013.01)

(58) Field of Classification Search
CPC ..... H04W 48/02; H04W 76/25; H04W 76/27; H04W 48/14; H04W 84/042;
(Continued)

(56) References Cited

U.S. PATENT DOCUMENTS

2005/0026597 A1* 2/2005 Kim ...................... H04W 48/12
455/412.1
2011/0201343 A1* 8/2011 Pinheiro ............... H04W 76/27
455/450

(Continued)

FOREIGN PATENT DOCUMENTS

| CN | 102223678 | 10/2011 |
| CN | 104159262 | 11/2014 |

(Continued)

OTHER PUBLICATIONS

EPO, EESR for EP Application No. 18875899.9, Sep. 28, 2020.
(Continued)

*Primary Examiner* — Andrew Wendell
(74) *Attorney, Agent, or Firm* — Hodgson Russ LLP

(57) ABSTRACT

A method for access control applied to a user equipment (UE) includes: generating a first cause value through a radio resource control (RRC) layer; encapsulating the first cause value in an RRC dedicated signaling; and sending the RRC dedicated signaling and encapsulated with the first cause value to a network side device, wherein the RRC dedicated signaling is used by the network side device for access control.

12 Claims, 6 Drawing Sheets

(51) Int. Cl.
*H04W 48/02* (2009.01)
*H04W 76/25* (2018.01)
*H04W 48/14* (2009.01)
*H04W 84/04* (2009.01)

(58) Field of Classification Search
CPC .. H04W 74/004; H04W 76/10; H04B 7/2612; H04B 3/544; H04B 7/18558
See application file for complete search history.

(56) References Cited

U.S. PATENT DOCUMENTS

| | | | |
|---|---|---|---|
| 2012/0020262 A1* | 1/2012 | Peng | H04W 36/14 370/310 |
| 2012/0270555 A1* | 10/2012 | Wei | H04L 5/0028 455/450 |
| 2014/0057639 A1 | 2/2014 | Nanjaiah | |
| 2014/0304937 A1 | 10/2014 | Kim et al. | |
| 2015/0304937 A1* | 10/2015 | Kim | H04W 80/10 370/230 |
| 2018/0020382 A1* | 1/2018 | Kim | H04W 36/0055 |
| 2018/0254842 A1* | 9/2018 | Hua | H04W 52/243 |
| 2018/0263076 A1* | 9/2018 | Andreoli-Fang | H04L 41/0826 |
| 2018/0295556 A1 | 10/2018 | Baek et al. | |
| 2019/0335532 A1* | 10/2019 | Kim | H04W 4/40 |
| 2020/0187088 A1* | 6/2020 | Chun | H04L 69/322 |

FOREIGN PATENT DOCUMENTS

| | | |
|---|---|---|
| CN | 104871603 | 8/2015 |
| CN | 106105278 | 11/2016 |
| CN | 107040967 | 8/2017 |
| WO | 2014190467 | 12/2014 |
| WO | 2017052342 | 3/2017 |

OTHER PUBLICATIONS

Ericsson, Draft LS on Establishment Causes in NR, 3GPP TSG RAN WG2#99bis, Tdoc R2-1710481, Jan. 2017, 1 page.
WIPO, ISR for PCT/CN2018/081995, Aug. 1, 2018.
WIPO, ISR for PCT/CN2017/110292, Jul. 26, 2018.
EPO, Communication for EP Application No. 18875899.9, dated Apr. 16, 2021.
SIPO, First Office Action for CN Application No. 201880054853.X, dated Mar. 2, 2021.

* cited by examiner

FIG. 8
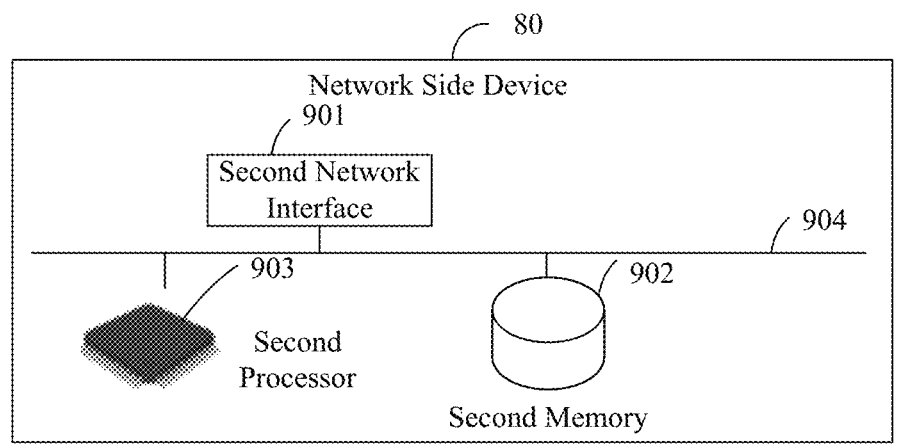
FIG. 9
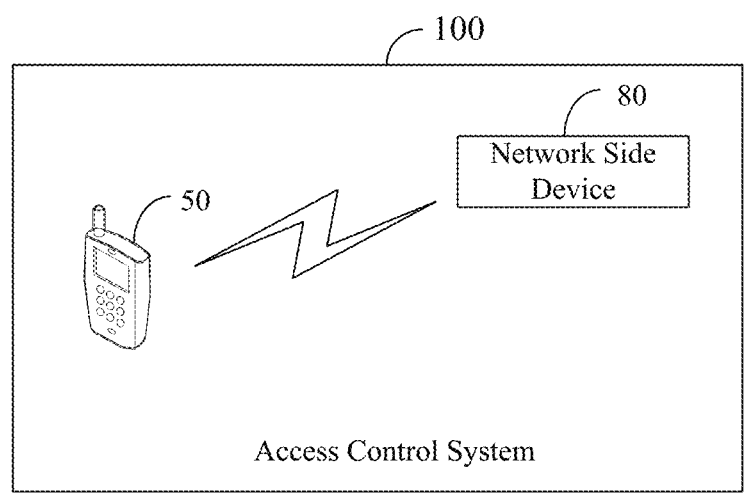
FIG. 10

ACCESS CONTROL METHOD AND DEVICE, COMPUTER READABLE MEDIUM AND SYSTEM

CROSS-REFERENCE TO RELATED APPLICATIONS

This application is a U.S. national phase application of International Application No. PCT/CN2018/081995, filed Apr. 4, 2018, which claims priority to International Application No. PCT/CN2017/110292, filed Nov. 9, 2017, the entire disclosures of which are incorporated herein by reference.

Technical Field

The present application relates to the field of wireless communication, and more particularly, to an access control method and device, computer-readable medium and system.

Background

In the Long Term Evolution (LTE) system, in order to avoid network overload, an Access Control Barring (ACB) mechanism is introduced. In addition, various access control mechanisms are also introduced, such as Application Specific Congestion Control for Data Communication (ACDC), Extended Access Barring (EAB), and Service-specific Access Control (SSAC).

With the development of communication technology, research on the fifth generation mobile communication technology (5G, 5th Generation) has also begun. 5G wireless access is called New Radio, referred to as NR. In 5G NR, in order to avoid the increase of system design complexity caused by different access control mechanisms, a Unified Access Control (UAC) mechanism needs to be designed and implemented. In the LTE system, the implementation of the access control (AC) mechanism is usually based on a cause value provided in a Non-Access Stratum (NAS) message, and the NAS message is mapped to the corresponding access category. In addition, each access category has different barring parameters, so as to achieve barring processing with different probabilities and maintain different barring times.

As can be seen from the above AC mechanism under the LTE system, the AC mechanisms in related art all require the NAS layer to provide the cause value. In the 5G system, however, User Equipment (UE) can be in a connected state or an inactive state. When the UE is in the connected state, the UE is connected to the access network and the core network; when the UE is in the inactive state, the UE is connected to the access network but not connected to the core network. At this time, the access of the UE is not triggered by the NAS layer, and the cause value cannot be provided by the NAS layer. To sum up, in the related art, it is impossible to perform access control on access triggered by the non-NAS layer.

SUMMARY

In order to solve the technical problem as described above, embodiments of the disclosure are directed to provide an access control method and device, computer-readable medium and system, enabling access control on the access triggered by the non-NAS layer.

The technical solution according to embodiments of the disclosure may be implemented as follows.

According to a first aspect, embodiments of the disclosure provide an access control method, the method is applied to a user equipment (UE) and includes:
generating a first cause value through a radio resource control (RRC) layer;
encapsulating the first cause value in an RRC dedicated signaling to be sent; and
sending the RRC dedicated signaling to be sent and encapsulated with the first cause value to a network side device, wherein the RRC dedicated signaling to be sent is used by the network side device for access control.

According to a second aspect, embodiments of the disclosure provide an access control method, the method is applied to a network side device and includes:
receiving a radio resource control (RRC) dedicated signaling sent by a user equipment (UE);
parsing the RRC dedicated signaling to obtain a first cause value included in the RRC dedicated signaling, wherein the first cause value is generated by the UE through an RRC layer;
determining, according to the first cause value, an access category corresponding to the RRC dedicated signaling; and
performing access control (AC) on the RRC dedicated signaling according to the access category.

According to a third aspect, embodiments of the disclosure provide a user equipment (UE), which may include: a generating part, an encapsulating part and a sending part; wherein the generating part is configured to generate a first cause value through a radio resource control (RRC) layer;
the encapsulating part is configured to encapsulate the first cause value in an RRC dedicated signaling to be sent; and
the sending part is configured to send the RRC dedicated signaling to be sent and encapsulated with the first cause value to a network side device, wherein the RRC dedicated signaling to be sent is used by the network side device for access control.

According to a fourth aspect, embodiments of the disclosure provide a network side device, including: a receiving part, a parsing part, a querying part and a controlling part, wherein,
the receiving part is configured to receive a radio resource control (RRC) dedicated signaling sent by a user equipment (UE);
the parsing part is configured to parse the RRC dedicated signaling to obtain a first cause value included in the RRC dedicated signaling, wherein the first cause value is generated by the UE through an RRC layer;
the querying part is configured to determine, according to the first cause value, an access category corresponding to the RRC dedicated signaling; and
the controlling part is configured to perform access control (AC) on the RRC dedicated signaling according to the access category.

According to a fifth aspect, embodiments of the disclosure provide a user equipment (UE), including: a first network interface, a first memory, and a first processor; wherein,
the first network interface is configured to receive and send signals during a process of transceiving information with another external network elements;
the first memory is configured to store a computer program capable of running on the first processor; and
the first processor is configured to execute, when running the computer program, steps of the method according to the first aspect.

According to a sixth aspect, embodiments of the disclosure provide a network side device, including: a second network interface, a second memory, and a second processor; wherein, the second network interface is configured to receive and send signals during a process of transceiving information with another external network elements;

the second memory is configured to store a computer program capable of running on the second processor; and the second processor is configured to execute, when running the computer program, steps of the method according to the second aspect.

According to a seventh aspect, embodiments of the disclosure provide a computer-readable medium storing a program for access control, the program for access control implements, when executed by at least one processor, steps of the method according to the first aspect or the second aspect.

According to an eighth aspect, embodiments of the disclosure provide a system for access control, including a user equipment (UE) and a network side device; wherein, the user equipment is configured to generate a first cause value through a radio resource control (RRC) layer;

encapsulate the first cause value in an RRC dedicated signaling to be sent; and send the RRC dedicated signaling to be sent and encapsulated with the first cause value to a network side device, wherein the RRC dedicated signaling to be sent is used by the network side device for access control;

the network side device is configured to receive an RRC dedicated signaling sent by the user equipment (UE);

parse the RRC dedicated signaling to obtain a first cause value included in the RRC dedicated signaling, wherein the first cause value is generated by the UE through an RRC layer;

determine, according to the first cause value, an access category corresponding to the RRC dedicated signaling; and perform access control (AC) on the RRC dedicated signaling according to the access category.

According to the method, device, computer-readable medium and system for access control provided by embodiments of the disclosure, the terminal encapsulates the first cause value generated by RRC layer in the RRC dedicated signaling to be sent, enabling the network side device, after receiving the RRC dedicated signaling to be sent, to perform access control based on the first cause value provided by the RRC layer of the UE even if a second cause value provided by an NAS layer is not obtained, thereby achieving access control on the access triggered by a non-NAS layer.

BRIEF DESCRIPTION OF THE DRAWINGS

FIG. 9 is a schematic diagram illustrating a hardware structure of a network side device according to an embodiment of the disclosure.

FIG. 10 is a schematic block diagram of an access control system according to an embodiment of the disclosure.

DETAILED DESCRIPTION

In order to understand the features and technical contents of embodiments of the present disclosure in more detail, implementation of the embodiments of the present disclosure will be described in detail below with reference to the accompanying drawings. The accompanying drawings are for reference only and are not intended to limit the embodiments of the present disclosure.

Embodiment I

Figure 1:
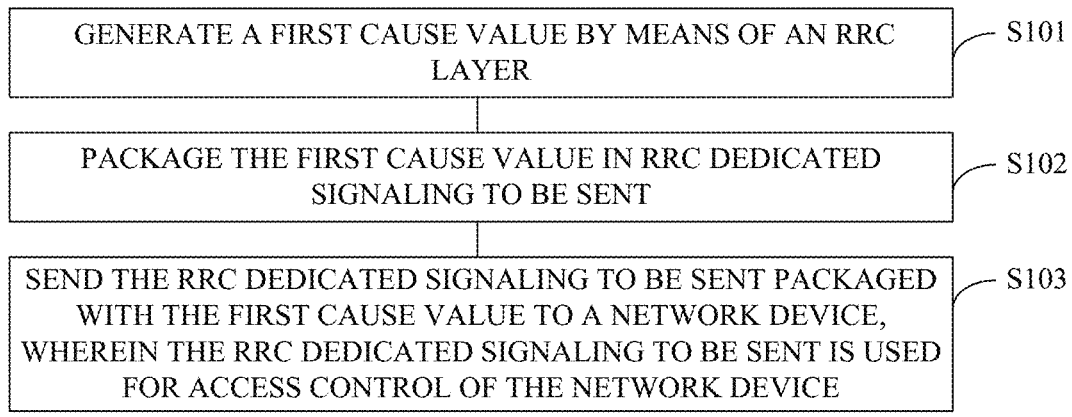
FIG. 1 is a schematic flowchart of an access control method according to an embodiment of the disclosure.

Referring to FIG. 1, it illustrates an access control (AC) method according to an embodiment of the disclosure. The method may be applied to a user equipment (UE) and include:

S101, generating a first cause value through a radio resource control (RRC) layer;

S102, encapsulating the first cause value in an RRC dedicated signaling to be sent; and S103, sending the RRC dedicated signaling to be sent and encapsulated with the first cause value to a network side device, wherein the RRC dedicated signaling to be sent is used by the network side device for access control.

It may be understood that, the UE in a connected state or an inactive state generates the first cause value for AC through the RRC layer, and encapsulates it in the RRC dedicated signaling to be sent to the network side device. Therefore, in case that the NAS layer of the UE does not provide a second cause value, the network side device is still able to perform AC control according to the first cause value generated by the RRC layer.

It should be noted that, for the technical solution shown in FIG. 1, regardless of whether the NAS layer of the UE provides the second cause value in the RRC dedicated signaling to be sent, the UE can generate the first cause value through the RRC layer and encapsulate it in the RRC dedicated signaling to be sent. That is to say, in the RRC dedicated signaling to be sent, a priority of the second cause value may be higher than the first cause value, that is, when the network side device receives the RRC dedicated signaling to be sent, it may perform AC preferably according to the second cause value; if there is no second cause value in the RRC dedicated signaling to be sent, AC is performed according to the first cause value.

For the above description, the RRC dedicated signaling to be sent may include both the first cause value and the second cause value, but carrying both cause values simultaneously may increase the resource overhead in the signaling transmission process. In view of this, the UE may provide the first cause value through the RRC layer when the NAS layer cannot provide the second cause value. The UE may determine the case where the NAS layer cannot provide the second cause value in multiple ways. Therefore, the embodiments will be described by using the following two optional examples.

For the first optional example, before generating the first cause value through the RRC layer, the method may further include:

detecting whether there is a second cause value provided by a non-access stratum (NAS) in the RRC dedicated signaling to be sent; and generating, when there is no second cause value in the RRC dedicated signaling to be sent, the first cause value through the RRC layer.

It may be understood that, the UE can directly detect the RRC dedicated signaling to be sent. if the RRC dedicated signaling to be sent is not triggered by the NAS layer, or the NAS layer cannot provide a second cause value in the RRC signaling to be sent, there is no second cause value in the RRC dedicated signaling to be sent. Therefore, when the second cause value does not exist in the RRC dedicated signaling to be sent, it means that the network side device needs to perform AC control by using the first cause value.

For the second optional example, before generating the first cause value through the RRC layer, the method may further include:

detecting an RRC state of the UE; and generating, when the UE is in a connected state or an inactive state, the first cause value through the RRC layer.

It may be understood that, when the UE is in the connected state or inactive state, the UE is at least connected to the access network, thus the RRC message will not be triggered by the NAS layer when the UE is in the connected state or inactive state. Therefore, in the above two states, the NAS layer also cannot provide the second cause value, which indicates that the network side device needs to perform AC control by using the first cause value.

For the technical solution shown in FIG. 1, in a possible implementation manner, in order to avoid conflict with a value range where the second cause value is located, preferably, the encapsulating the first cause value in an RRC dedicated signaling to be sent includes:

providing an information element (IE) additionally in the RRC dedicated signaling to be sent; and filling the first cause value into the additionally provided IE.

Figure 2:
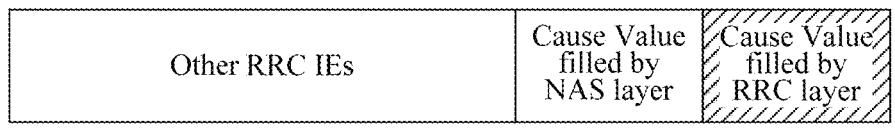
FIG. 2 is a schematic structural diagram of an RRC dedicated signaling according to an embodiment of the disclosure.

For this implementation manner, referring to FIG. 2, which illustrates schematic diagram of an IE of the RRC dedicated signaling provided by an embodiment of the disclosure. It can be seen that in the original RRC dedicated signaling, referring to the unfilled box, in addition to other RRC IEs, there is also an IE whose content is the cause value filled by the NAS layer, that is, the second cause value. According to the embodiment, an additional IE is added, as shown by the slashed box shown in FIG. 2, the content in the additional IE is the cause value filled by the RRC layer, that is, the first cause value.

It may be understood that, the UE may provide the additional IE to fill the first cause value in the RRC dedicated signaling to be sent, thereby distinguishing from the second cause value provided by the NAS layer, so as to avoid a coordination process between the NAS layer and the RRC layer caused by filling the first cause value and the second cause value in the same IE.

Preferably, in FIG. 2, the IEs where the first cause value and the second cause value are located are independent of each other. However, based on the foregoing description, if the priority of the second cause value is higher than that of the first cause value, in the RRC dedicated signaling to be sent, the additional IE may be provided after the IE where the second cause value provided by the NAS is located. In this way, during the process of parsing the RRC dedicated signaling to be sent, the network side device first detects the second cause value, and then determines whether to detect the first cause value, for performing AC, based on the presence or absence of the second cause value.

According to the method for access control provided by the embodiments, the terminal encapsulates the first cause value generated by RRC layer in the RRC dedicated signaling to be sent, enabling the network side device, after receiving the RRC dedicated signaling to be sent, to perform access control based on the first cause value provided by the RRC layer of the UE even if a second cause value provided by an NAS layer is not obtained, thereby achieving access control on the access triggered by a non-NAS layer.

Embodiment II

Figure 3:
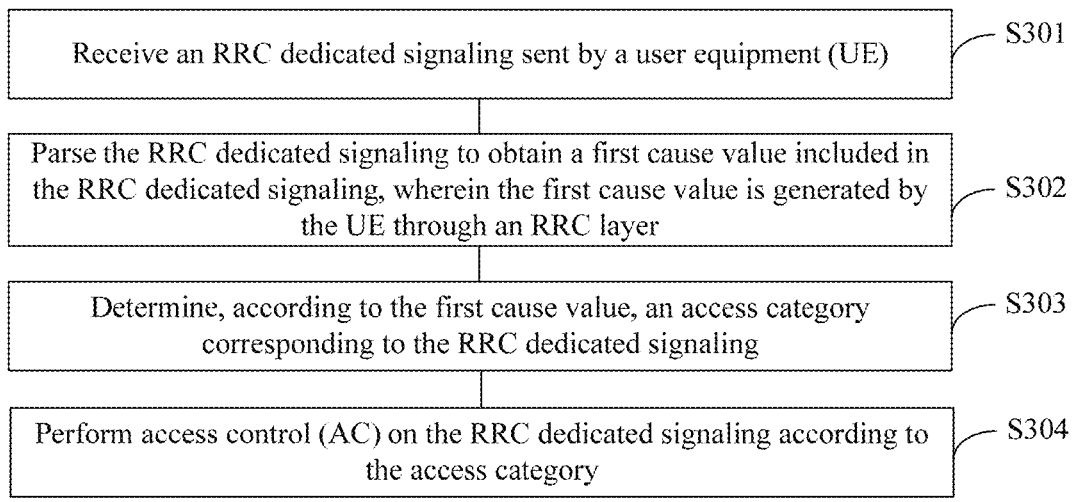
FIG. 3 is a schematic flowchart of an access control method according to another embodiment of the disclosure.

Based on the same inventive concept of the previous embodiments, referring to FIG. 3, it illustrates an access control method provided by an embodiment of the disclosure. The method can be applied to a network side device, which may specifically be a 5G base station gNB or a core access and mobility management function (AMF). The method may include:

S301, receiving an RRC dedicated signaling sent by a user equipment (UE);

S302, parsing the RRC dedicated signaling to obtain a first cause value included in the RRC dedicated signaling, wherein the first cause value is generated by the UE through an RRC layer;

S303, determining, according to the first cause value, an access category corresponding to the RRC dedicated signaling; and S304, performing access control (AC) on the RRC dedicated signaling according to the access category.

It may be understood that, in the embodiment, the network side device performs access control (AC) according to the first cause value in the RRC dedicated signaling, thereby enabling the network side device to perform access control (AC) for the RRC dedicated signaling triggered by the non-NAS layer or when the RRC dedicated signaling cannot provide a cause value.

Based on the technical solution shown in FIG. 3, in a possible implementation manner, the parsing the RRC dedicated signaling to obtain the first cause value included in the RRC dedicated signaling includes:

parsing the RRC dedicated signaling, and determining whether there is a second cause value provided by a non-access layer (NAS) in the RRC dedicated signaling;

determining, when there is no second cause value in the RRC dedicated signaling, whether the first cause value generated by the RRC layer exists; and obtains, when the first cause value exists in the RRC dedicated signaling, the first cause value.

Generally, when there is a second reason value provided by the NAS layer of the UE in the RRC dedicated signaling, the network side device will obtain the access category corresponding to the second reason value, and then the RRC protocol layer of the network side device can perform access control according to the access category corresponding to the second cause value. Therefore, it can be seen that the priority of the second cause value may be higher than the priority of the first cause value. Accordingly, in this embodiment, it is first detected whether a second cause value exists; if it exists, access control is performed according to the access category corresponding to the second cause value; if it does not exist, it continues to detect whether the first cause value exists. If there is a first cause value, access control may be performed according to an access category corresponding to the first cause value.

Based on the technical solution of the first embodiment, it can be learned that, in order to avoid the coordination process between the NAS layer and the RRC layer caused by filling the first cause value and the second cause value in the same IE, the UE may provide an additional IE to fill in the first cause value distinguishing from the second cause value provided by the NAS layer. The IEs where the first cause value and the second cause value are located are independent of each other. Based on this, in the above implementation manner, the determining whether the first cause value generated by the RRC layer exists may include:

determining whether there is an additionally provided information element (IE); and detecting, when there is the additionally provided IE, whether the first cause value exists in the additionally provided IE.

Furthermore, in order to sequentially detect the RRC dedicated signaling, the IE where the first cause value is located may be preferably provided after the IE where the second cause value is located.

According to the method for access control provided by the embodiments, the network side device is able to perform, after receiving the RRC dedicated signaling to be sent, access control based on the first cause value provided by the RRC layer of the UE even if a second cause value provided by the NAS layer is not obtained, thereby achieving access control on the access triggered by a non-NAS layer.

Embodiment III

Figure 4:
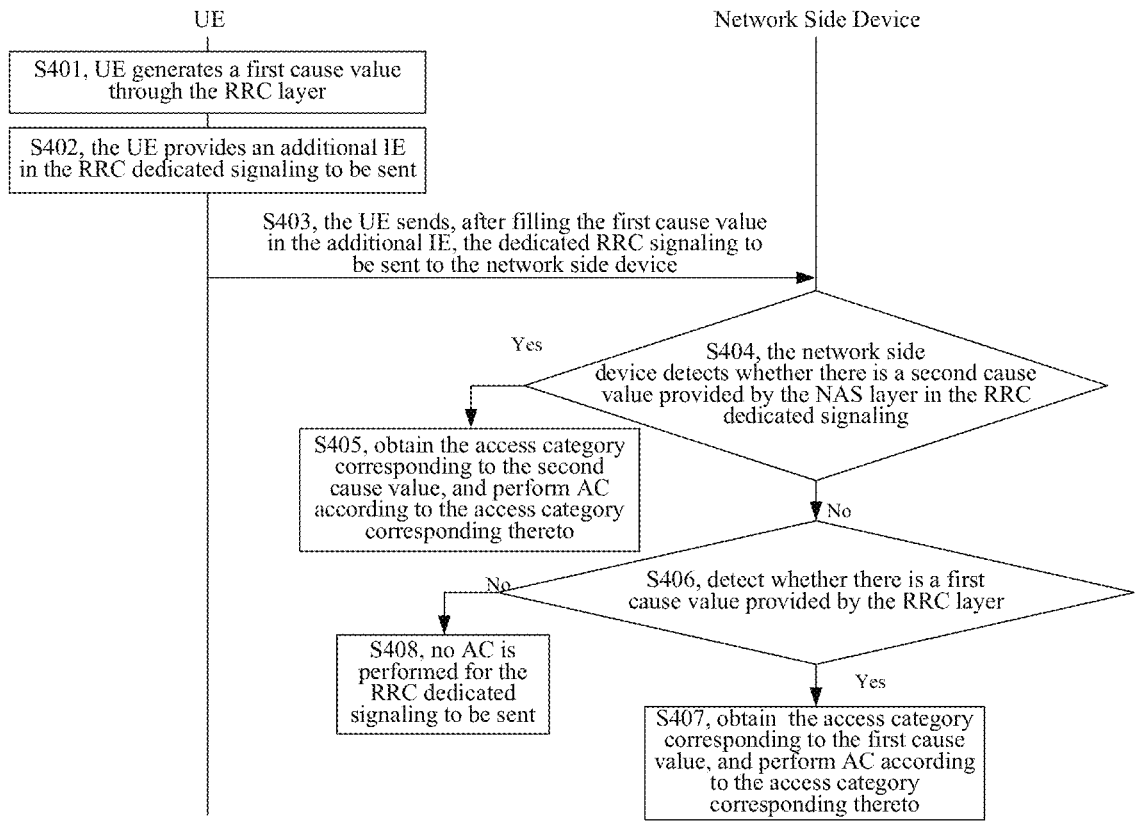
FIG. 4 is a schematic flowchart illustrating a specific implementation of an access control method according to an embodiment of the disclosure.

Based on the same inventive concept of the previous embodiments, referring to FIG. 4, it illustrates a specific process of the access control according to an embodiment of the disclosure. The specific process is generally applicable to an RRC signaling trigger by a non-NAS layer or a case where it is unable to provide a cause value in the RRC signaling and may include following steps.

In S401, UE generates a first cause value through the RRC layer.

In S401, the UE provides an additional IE in the RRC dedicated signaling to be sent.

In S403, the UE sends, after filling the first cause value in the additional IE, the dedicated RRC signaling to be sent to the network side device.

It should be noted that no matter whether the NAS layer of the UE provides the second cause value in the RRC dedicated signaling to be sent, the UE can generate the first cause value through the RRC layer. It may be understood that, if the NAS layer of the UE can provide the second cause value in the RRC dedicated signaling to be sent, it indicates that the RRC dedicated signaling to be sent is triggered by the NAS layer of the UE. Generally, the RRC dedicated signaling triggered by the NAS layer includes, for example, a tracking area update (TAU) message and a service request message; and the RRC signaling not triggered by the NAS layer or where the NAS layer cannot provide a cause value includes, for example, a message requesting on-demand system information, a requesting side link UE Information (sidelinkUEInformation) message and the like.

It may be understood that, after the UE sends the dedicated RRC signaling to be sent including the first cause value to the network side device, the network side device can perform access control (AC) according to the cause value (no matter whether it is the first cause value or the second cause value) in the dedicated RRC signaling to be sent.

In S404, the network side device detects whether there is a second cause value provided by the NAS layer in the RRC dedicated signaling.

If yes, it goes to S405: obtaining the access category corresponding to the second cause value, and performing access control according to the access category corresponding to the second reason value.

Otherwise, it goes to S406: detecting whether there is a first cause value provided by the RRC layer.

If yes, it goes to S407: obtaining the access category corresponding to the first cause value, and performing access control according to the access category corresponding to the first reason value.

Otherwise, it goes to S408: no access control (AC) is performed for the RRC dedicated signaling to be sent.

It may be understood that, different access categories correspond to different barring parameters, thereby implementing barring process with different probabilities and maintaining different barring times.

Through the technical solution shown in FIG. 4, it can be seen that when the NAS layer cannot provide the cause value, the network side device can perform access control based on the first cause value provided by the RRC layer of the UE, thereby performing access control on the access triggered by the non-NAS layer.

Embodiment IV

Figure 5:
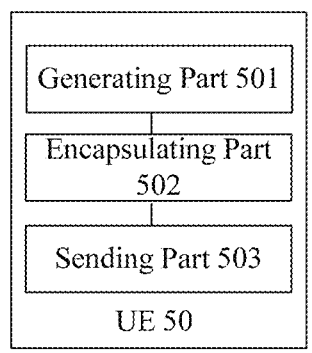
FIG. 5 is a schematic block diagram of a user equipment according to an embodiment of the disclosure.

Based on the same inventive concept of the previous embodiments, referring to FIG. 5, it illustrates composition of an UE 50 according to an embodiment of the disclosure, which may include: a generating part 501, an encapsulating part 502 and a sending part 503; wherein the generating part 501 is configured to generate a first cause value through a radio resource control (RRC) layer;

the encapsulating part 502 is configured to encapsulate the first cause value in an RRC dedicated signaling to be sent; and the sending part 503 is configured to send the RRC dedicated signaling to be sent and encapsulated with the first cause value to a network side device, wherein the RRC dedicated signaling to be sent is used by the network side device for access control.

Figure 6:
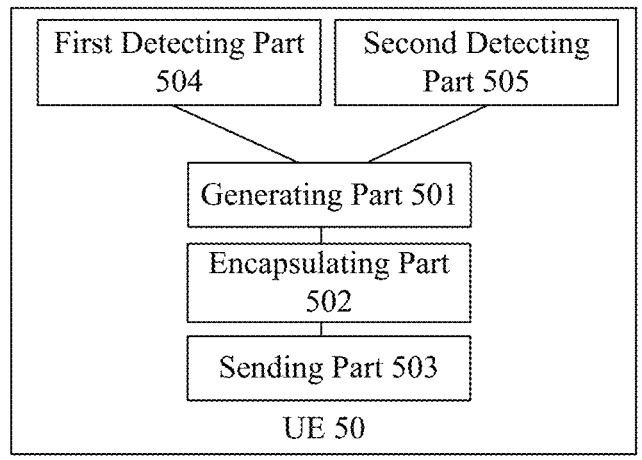
FIG. 6 is a schematic block diagram of a user equipment according to another embodiment of the disclosure.

In a possible implementation manner, referring to FIG. 6, the UE 50 further includes: a first detecting part 504, configured to detect whether there is a second cause value provided by a non-access stratum (NAS) in the RRC dedicated signaling to be sent; and trigger the generating part 501 when there is no second cause value in the RRC dedicated signaling to be sent.

In a possible implementation manner, referring to FIG. 6, the UE 50 further includes: a second detecting part 505, configured to detect an RRC state of the UE; and trigger the generating part 501 when the UE is in a connected state or an inactive state.

In a possible implementation manner, the encapsulating part 502 is configured to: provide an information element (IE) additionally in the RRC dedicated signaling to be sent; and fill the first cause value into the additionally provided IE, wherein the additionally provided IE is independent of an IE where the second cause value provided by the NAS layer is located.

Specifically, the UE 50 described in this embodiment may include a cellular phone, a smart phone, a Session Initiation Protocol (SIP) phone, a laptop computer, a personal digital assistant (PDA), a satellite radio, a global positioning system, a multimedia device, a video device, a digital audio player (e.g., a MP3 player), a camera, a game console, a tablet computer, or any other device with similar capabilities. Also, the terminal device may also be referred to by those skilled in the art as user equipment, terminal, mobile station, subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable term.

It may be understood that, in this embodiment, the "part" may be a part of a circuit, a part of a processor, a part of a program or software, and the like, it may be a unit and may be a module or a non-modular.

In addition, each part in this embodiment may be integrated into one processing unit, or each part may exist separately physically, or two or more parts may be integrated into one unit. The above integrated unit may be implemented in the form of hardware or in the form of software functional modules.

If the integrated unit is implemented in the form of a software functional module and is sold or used as an independent product, it may be stored in a computer-readable storage medium. Based on such understanding, the essential part of the technical solution of the embodiments, or a part thereof that contributes to the prior at, or all or part of the technical solution may be embodied in the form of a software product. The computer software product is stored in a storage medium and includes several instructions for causing a computer device (a personal computer, a server, a network device and the like) or a processor to perform all or part of the steps of the method described in the embodiments. The foregoing storage medium includes various medium that can store program codes, such as a U disk, a mobile hard disk, a read only memory (ROM), a random access memory (RAM), a magnetic disk, or an optical disc.

Therefore, the embodiments provide a computer-readable medium that stores a program for access control. When the program for access control is executed by at least one processor, steps of the method according to the first embodiment can be implemented.

Figure 7:
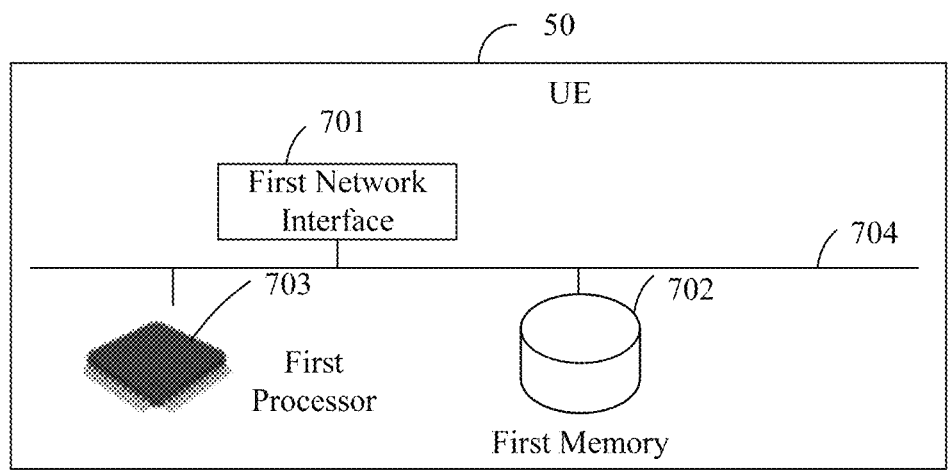
FIG. 7 is a schematic diagram illustrating a hardware structure of a user equipment according to an embodiment of the disclosure.

Based on the user equipment (UE) 50 and computer-readable medium as described above, referring to FIG. 7, it illustrates a specific hardware structure of the UE 50 according to an embodiment of the disclosure, which may include: a first network interface 701, a first memory 702, and a first processor 703; each component is coupled together through a bus system 704. It can be understood that the bus system 704 is used for implementing connection and communication between these components. The bus system 704 includes a power bus, a control bus, and a status signal bus in addition to the data bus. However, for the sake of clarity, various buses are labeled as the bus system 704 in FIG. 7. The first network interface 701 is configured to receive and send signals during a process of transceiving information with another external network elements;

the first memory 702 is configured to store a computer program capable of running on the first processor 703; and the first processor 703 is configured to, when running the computer program, execute:

generating a first cause value through a radio resource control (RRC) layer;

encapsulating the first cause value in an RRC dedicated signaling to be sent; and sending the RRC dedicated signaling to be sent and encapsulated with the first cause value to a network side device, wherein the RRC dedicated signaling to be sent is used by the network side device for access control.

It can be understood that the first memory 702 in the embodiment of the disclosure may be a volatile memory or a non-volatile memory, or may include both a volatile and a non-volatile memory. Among them, the non-volatile memory may be a read-only memory (ROM), a programmable read-only memory (PROM), an erasable programmable read-only memory (Erasable PROM, EPROM), an electrically erasable programmable read-only memory (Electrically EPROM, EEPROM) or flash memory. The volatile memory may be a random access memory (RAM), which is used as an external cache. By way of example, but not limitation, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink dynamic random access memory (Synchlink DRAM, SLDRAM) and direct memory bus random access memory (Direct Rambus RAM, DRRAM). The first memory 702 of the systems and methods described herein is intended to include, but is not limited to, these and any other suitable types of memory.

The first processor 703 may be an integrated circuit chip and has a signal processing capability. In the implementation process, each step of the foregoing method may be completed by using an integrated logic circuit of hardware in the first processor 703 or an instruction in a form of software. The above-mentioned first processor 703 may be a general-purpose processor, a digital signal processor (DSP), an application specific integrated circuit (ASIC), a field programmable gate array (FPGA), other programmable logic devices, discrete gate or transistor logic devices, discrete hardware components. Various methods, steps, and logical block diagrams disclosed in the embodiments of the disclosure may be implemented or executed. The general-purpose processor may be a microprocessor or the processor may be any conventional processor or the like. The steps of the method disclosed in combination with the embodiments of the disclosure may be directly implemented by a hardware decoding processor, or may be performed by a combination of hardware and software modules in the decoding processor. The software module may be located in a conventional storage medium such as a random access memory, a flash memory, a read-only memory, a programmable read-only memory, or an electrically erasable programmable memory, a register, and the like. The storage medium is located in the first memory 702, and the first processor 703 reads information in the first memory 702 and completes the steps of the foregoing method in combination with its hardware.

It can be understood that the embodiments described herein may be implemented by hardware, software, firmware, middleware, microcode, or a combination thereof. For hardware implementation, the processing unit can be implemented in one or more application specific integrated circuits (ASICs), digital signal processors (DSPs), digital signal processing devices (DSPDs), programmable logic devices (PLDs), field-programmable gate arrays (FPGAs), general-purpose processors, controllers, microcontrollers, microprocessors, other electronic units for performing the functions described in the present application, or a combination thereof.

For software implementation, the techniques described herein can be implemented through modules (such as procedures, functions and the like) that perform the functions described herein. Software codes may be stored in a memory and executed by a processor. The memory may be implemented in the processor or external to the processor.

Specifically, the first processor 703 in the user equipment (UE) 50 is further configured to execute steps of the method described in the foregoing embodiment I when running the computer program, and details are not described herein again.

Embodiment V

Figure 8:
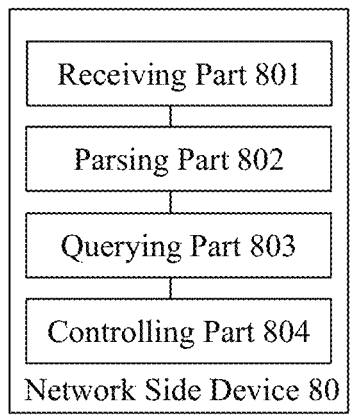
FIG. 8 is a schematic block diagram of a network side device according to an embodiment of the disclosure.

Based on the same inventive concept of the previous embodiments, referring to FIG. 8, it illustrates a network side device 80 according to an embodiment of the disclosure, which may include: a receiving part 801, a parsing part 802, a querying part 803 and a controlling part 804, wherein, the receiving part 801 is configured to receive a radio resource control (RRC) dedicated signaling sent by a user equipment (UE);

the parsing part 802 is configured to parse the RRC dedicated signaling to obtain a first cause value included in the RRC dedicated signaling, wherein the first cause value is generated by the UE through an RRC layer;

the querying part 803 is configured to determine, according to the first cause value, an access category corresponding to the RRC dedicated signaling; and the controlling part 804 is configured to perform access control (AC) on the RRC dedicated signaling according to the access category.

In a possible implementation manner, the parsing part 802 is configured to:

parse the RRC dedicated signaling, and determine whether there is a second cause value provided by a non-access layer (NAS) in the RRC dedicated signaling;

determine, when there is no second cause value in the RRC dedicated signaling, whether the first cause value generated by the RRC layer exists; and obtain, when the first cause value exists in the RRC dedicated signaling, the first cause value.

In a possible implementation manner, the querying part 803 is configured to:

determine whether there is an additionally provided information element (IE); and detect, when there is the additionally provided IE, whether the first cause value exists in the additionally provided IE.

Specifically, the network side device 80 involved with the embodiments may be a gNB or AMF, which is not limited by the embodiments.

The embodiments further provide a computer-readable medium that stores a program for access control. When the program for access control is executed by at least one processor, steps of the method according to the embodiment II are implemented. The specific description of the computer-readable medium may refer to the description in the embodiment IV, and details are not described herein again.

Based on the network side device 80 and computer-readable medium as described above, referring to FIG. 9, it illustrates a specific hardware structure of the network side device 80 according to an embodiment of the disclosure, which may include: a second network interface 901, a second memory 902, and a second processor 903; each component is coupled together through a bus system 904. It can be understood that the bus system 904 is used for implementing connection and communication between these components. The bus system 904 includes a power bus, a control bus, and a status signal bus in addition to the data bus. However, for the sake of clarity, various buses are labeled as the bus system 904 in FIG. 9.

The second network interface 901 is configured to receive and send signals during a process of transceiving information with another external network elements;

the second memory 902 is configured to store a computer program capable of running on the second processor 903; and the second processor 903 is configured to, when running the computer program, execute:

receiving a radio resource control (RRC) dedicated signaling sent by a user equipment (UE);

parsing the RRC dedicated signaling to obtain a first cause value included in the RRC dedicated signaling, wherein the first cause value is generated by the UE through an RRC layer;

determining, according to the first cause value, an access category corresponding to the RRC dedicated signaling; and performing access control (AC) on the RRC dedicated signaling according to the access category.

It may be understood that, the components of the specific hardware structure of the network side device 80 in this embodiment are similar to the corresponding portions in the embodiment IV, and are not described herein again.

Specifically, the second processor 903 in the network side device 80 is further configured to execute steps of the method described in the foregoing embodiment II when running the computer program, and details are not described herein again.

Embodiment VI

Based on the same inventive concept of the previous embodiments, referring to FIG. 10, it illustrates a system 100 for access control according to an embodiment of the disclosure, including a user equipment (UE) 50 and a network side device 80.

The user equipment 50 is configured to generate a first cause value through a radio resource control (RRC) layer;

encapsulate the first cause value in an RRC dedicated signaling to be sent; and send the RRC dedicated signaling to be sent and encapsulated with the first cause value to the network side device 80, wherein the RRC dedicated signaling to be sent is used by the network side device 80 for access control.

The network side device 80 is configured to receive an RRC dedicated signaling sent by the user equipment (UE); parse the RRC dedicated signaling to obtain a first cause value included in the RRC dedicated signaling, wherein the first cause value is generated by the UE through an RRC layer;

determine, according to the first cause value, an access category corresponding to the RRC dedicated signaling; and perform access control (AC) on the RRC dedicated signaling according to the access category.

It should be noted that the user equipment (UE) 50 described in this embodiment may be the UE described in any of the foregoing embodiments; the network side device 80 described in this embodiment may be the network side device described in any of the foregoing embodiments, which will not be repeated here.

Through the technical solutions of the foregoing embodiments I to VI, it should be noted that the network side device can perform, after receiving the RRC signaling sent by the UE, access control based on the first cause value generated by the RRC layer of the UE in the RRC signaling, so as to perform access control on the access triggered by a non-NAS layer. It can be seen that, during the process of access control on the access triggered by the RRC layer or the NAS layer, the network side device needs to transmit the access control (AC) related parameters to the UE. The AC related parameters are used for describing a strategy of the network side device for performing access control. Based on the above description, the following embodiments are proposed.

Embodiment VII

Figure 11:
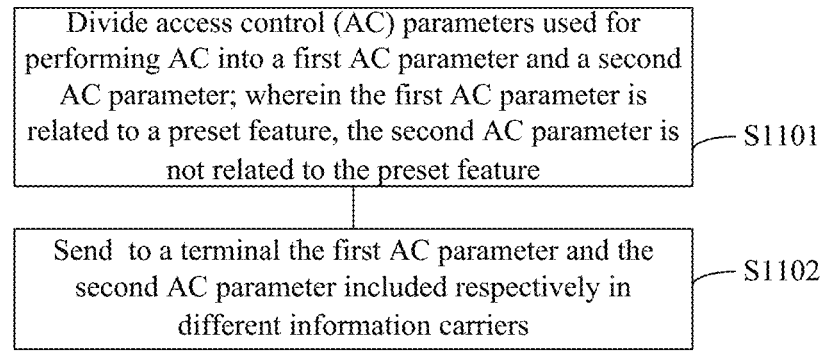
FIG. 11 is a schematic flowchart of an access control method according to still another embodiment of the disclosure.

Based on the same inventive concept of the previous embodiments, referring to FIG. 11, it illustrates a method for access control according to an embodiment of the disclosure. The method is applied to a network side device and includes:

S1101, dividing access control (AC) parameters used for performing AC into a first AC parameter and a second AC parameter; wherein the first AC parameter is related to a preset feature, the second AC parameter is not related to the preset feature; and S1102, sending to a terminal the first AC parameter and the second AC parameter included respectively in different information carriers.

It should be noted that, in addition to the AC parameters triggered by the NAS layer, the above-described AC parameters used for the access control AC may also include the AC parameters triggered by the RRC layer as described in the technical solutions of embodiments I-VI.

With the technical solution shown in FIG. 11, when the network side device performs access control, it needs to transmit the AC parameters for the access control (AC) to the UE. During the transmission of AC parameters, in order to avoid a situation in which the load of a single SIB is too large due to the large amount of data of the AC parameters, the AC parameters may be divided according to whether they are related to the preset feature and, then, the de-enriched (lightened) AC parameters may be transmitted to the terminal through different information carriers, thereby reducing the amount of data transmitted in a single SIB and reducing the load of system information broadcasting.

In the technical solution shown in FIG. 11, the preset feature may include: a public land mobile network (PLMN), or an access category.

For example, if the preset feature is PLMN, the first AC parameter is related to the PLMN, that is, a correspondence exists therebetween, and the first AC parameter is per-PLMN; the second AC parameter is not related to the PLMN, that is, there is no correspondence between the second AC parameter and the PLMN, or the second AC parameters are the same for different PLMNs. Based on this situation, the first AC parameter and the second AC parameter can be sent through different information carriers, thereby avoiding that, when the number of PLMNs supported by the AC parameters is too large, a single transmitted system information block (SIB) has a large load.

Based on the above example, if the preset feature is the access category, the correlation between the first AC parameter and the access category as well as the independence between the second AC parameter and the access category can be understood according to PLMN as the preset feature, which will be not described herein.

It may be understood that, in addition to the above two features, other features capable of dividing the AC parameters based on the correlation or independence can be applied to this embodiment, for example, the preset feature may be a network slice and the like, and details are not described herein again.

In the technical solution shown in FIG. 11, based on different correlations with the preset feature, the information carriers carrying the first AC parameter and the second AC parameter are also different. In a possible implementation manner, the sending to a terminal the first AC parameter and the second AC parameter included respectively in different information carriers includes:

sending to the terminal the first AC parameter included in a first system information block (SIB) or an RRC signaling; and sending to the terminal the second AC parameter included in a second SIB, wherein the first SIB is different from the second SIB.

For example, the first SIB may be SIB1, or the first AC parameter may also be carried in remaining minimum system information (RMSI). Then the second SIB may be a newly defined SIB or another SIB other than SIB1.

In the technical solution provided in this embodiment, during the transmission of AC parameters, in order to avoid a situation in which the load of a single SIB is too large due to the large amount of data of the AC parameters, the AC parameters can be divided according to whether they are related to the preset feature and, then, the de-enriched (lightened) AC parameters can be transmitted to the terminal through different information carriers, thereby reducing the amount of data transmitted in a single SIB and reducing the load of system information broadcasting.

Figure 12:
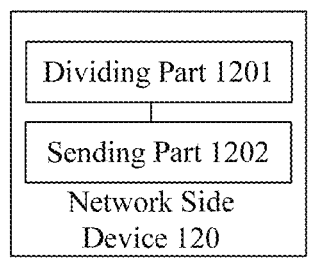
FIG. 12 is a schematic block diagram of a network side device according to another embodiment of the disclosure.

Based on the technical solution described with respect to FIG. 11, referring to FIG. 12, it illustrates composition of a network side device 120 according to an embodiment of the disclosure, which may include: a dividing part 1201 and a sending part 1202; wherein, the dividing part 1201 is configured to divide access control (AC) parameters used for performing AC into a first AC parameter and a second AC parameter; wherein the first AC parameter is related to a preset feature, the second AC parameter is not related to the preset feature; and the sending part 1202 is configured to send to a terminal the first AC parameter and the second AC parameter included respectively in different information carriers.

Based on the above-described solution, the sending part 1202 is configured to:

send to the terminal the first AC parameter included in a first system information block (SIB) or an RRC signaling; and send to the terminal the second AC parameter included in a second SIB, wherein the first SIB is different from the second SIB.

Based on the above-described solution, the preset feature includes: a public land mobile network (PLMN), or an access category.

The embodiments further provide a computer-readable medium that stores a program for access control. When the program for access control is executed by at least one processor, steps of the method shown in FIG. 11 are implemented. The specific description of the computer-readable medium may refer to the description in the embodiment IV, and details are not described herein again.

Figure 13:
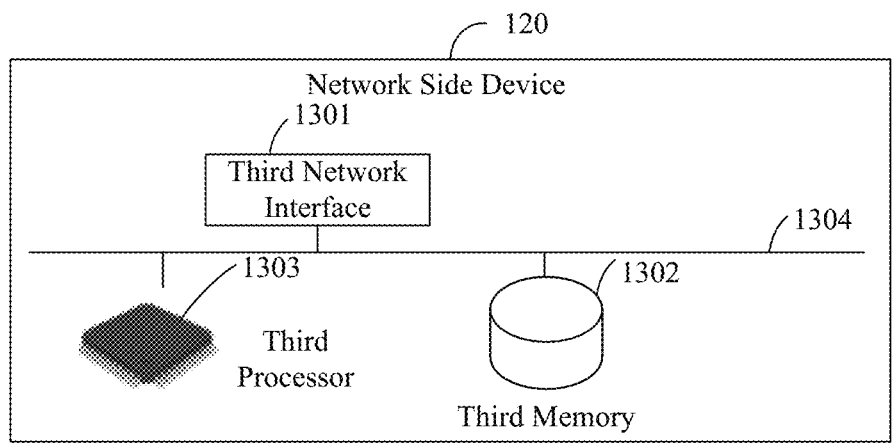
FIG. 13 is a schematic diagram illustrating a hardware structure of a network side device according to another embodiment of the disclosure.

Based on the network side device 120 and computer-readable medium as described above, referring to FIG. 13, it illustrates a specific hardware structure of the network side device 120 according to an embodiment of the disclosure, which may include: a third network interface 1301, a third memory 1302, and a third processor 1303; each component is coupled together through a bus system 1304. It can be understood that the bus system 1304 is used for implementing connection and communication between these components. The bus system 1304 includes a power bus, a control bus, and a status signal bus in addition to the data bus. However, for the sake of clarity, various buses are labeled as the bus system 1304 in FIG. 13. The third network interface 1301 is configured to receive and send signals during a process of transceiving information with another external network elements;

the third memory 1302 is configured to store a computer program capable of running on the third processor 1303; and the third processor 1303 is configured to, when running the computer program, execute:

dividing access control (AC) parameters used for performing AC into a first AC parameter and a second AC parameter; wherein the first AC parameter is related to a preset feature, the second AC parameter is not related to the preset feature; and sending to a terminal the first AC parameter and the second AC parameter included respectively in different information carriers.

It may be understood that, the components of the specific hardware structure of the network side device 120 in this embodiment are similar to the corresponding portions in the embodiment IV, and are not described herein again.

Specifically, the third processor 1303 in the network side device 120 is further configured to execute steps of the method shown in FIG. 11 when running the computer program, and details are not described herein again.

Embodiment VIII

Figure 14:
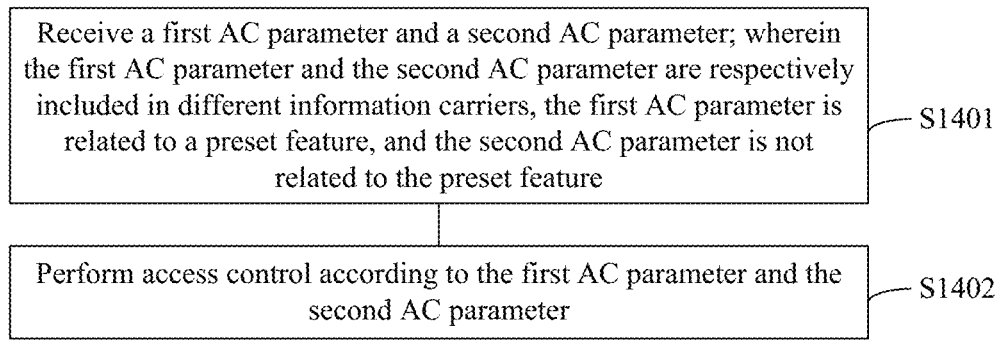
FIG. 14 is a schematic flowchart of an access control method according to yet another embodiment of the disclosure.

Based on the same inventive concept of the previous embodiments, referring to FIG. 14, it illustrates a method for access control according to an embodiment of the disclosure. The method is applied to a user equipment and includes:

S1401, receiving a first AC parameter and a second AC parameter; wherein the first AC parameter and the second AC parameter are respectively included in different information carriers, the first AC parameter is related to a preset feature, and the second AC parameter is not related to the preset feature; and S1402, performing access control according to the first AC parameter and the second AC parameter.

Based on the above-described solution, the first AC parameter is included in a first SIB or an RRC signaling; the second AC parameter is included in a second SIB, the first SIB being different from the second SIB.

Based on the above-described solution, the preset feature includes: a public land mobile network (PLMN), or an access category.

It may be understood that, the specific description of the technical solution according to this embodiment may refer to corresponding description of the embodiment VII, which will not be described herein.

Figure 15:
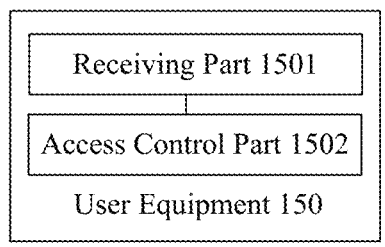
FIG. 15 is a schematic block diagram of a user equipment according to another embodiment of the disclosure.

Based on the technical solution described with respect to FIG. 14, referring to FIG. 15, it illustrates composition of a user equipment 150 according to an embodiment of the disclosure, which may include: a receiving part 1501 and an access control part 1502; wherein, the receiving part 1501 is configured to receive a first AC parameter and a second AC parameter; wherein the first AC parameter and the second AC parameter are respectively included in different information carriers, the first AC parameter is related to a preset feature, and the second AC parameter is not related to the preset feature; and the access control part 1502 is configured to perform access control according to the first AC parameter and the second AC parameter.

Based on the above-described solution, the first AC parameter is included in a first SIB or an RRC signaling; the second AC parameter is included in a second SIB, the first SIB being different from the second SIB.

Based on the above-described solution, the preset feature includes: a public land mobile network (PLMN), or an access category.

The embodiments further provide a computer-readable medium that stores a program for access control. When the program for access control is executed by at least one processor, steps of the method shown in FIG. 14 are implemented. The specific description of the computer-readable medium may refer to the description in the embodiment IV, and details are not described herein again.

Figure 16:
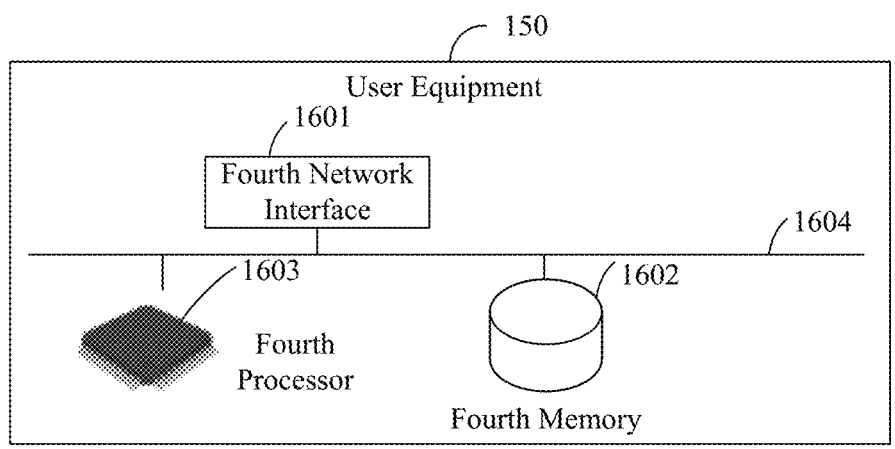
FIG. 16 is a schematic diagram illustrating a hardware structure of a user equipment according to another embodiment of the disclosure.

Based on the user equipment 150 and computer-readable medium as described above, referring to FIG. 16, it illustrates a specific hardware structure of the user equipment 150 according to an embodiment of the disclosure, which may include: a fourth network interface 1601, a fourth memory 1602, and a fourth processor 1603; each component is coupled together through a bus system 1604. It can be understood that the bus system 1604 is used for implementing connection and communication between these components. The bus system 1604 includes a power bus, a control bus, and a status signal bus in addition to the data bus. However, for the sake of clarity, various buses are labeled as the bus system 1604 in FIG. 16.

The fourth network interface 1601 is configured to receive and send signals during a process of transceiving information with another external network elements;

the fourth memory 1602 is configured to store a computer program capable of running on the fourth processor 1603; and the fourth processor 1603 is configured to, when running the computer program, execute:

receiving a first AC parameter and a second AC parameter; wherein the first AC parameter and the second AC parameter are respectively included in different information carriers, the first AC parameter is related to a preset feature, and the second AC parameter is not related to the preset feature; and performing access control according to the first AC parameter and the second AC parameter.

It may be understood that, the components of the specific hardware structure of the user equipment 150 in this embodiment are similar to the corresponding portions in the embodiment IV, and are not described herein again.

Specifically, the fourth processor 1603 in the user equipment 150 is further configured to execute steps of the method shown in FIG. 14 when running the computer program, and details are not described herein again.

The above description is only the preferred embodiments of the present disclosure, and is not intended to limit the protection scope of the present disclosure.

INDUSTRIAL APPLICABILITY

According to the embodiments of the disclosure, the terminal encapsulates the first cause value generated by RRC layer in the RRC dedicated signaling to be sent, enabling the network side device, after receiving the RRC dedicated signaling to be sent, to perform access control based on the first cause value provided by the RRC layer of the UE even if a second cause value provided by an NAS layer is not obtained, thereby achieving access control on the access triggered by a non-NAS layer.

What is claimed is:

1. A method for access control, the method being applied to a user equipment (UE) and comprising:
   generating a first cause value through a radio resource control (RRC) layer;
   encapsulating the first cause value in an RRC dedicated signaling; and
   sending the RRC dedicated signaling encapsulated with the first cause value to a network side device, wherein the RRC dedicated signaling is used by the network side device for access control.

2. The method according to claim 1, wherein before the generating a first cause value through a radio resource control (RRC) layer, the method further comprises:
   detecting whether there is a second cause value provided by a non-access stratum (NAS) in the RRC dedicated signaling; and
   generating, when there is no second cause value in the RRC dedicated signaling, the first cause value through the RRC layer.

3. The method according to claim 1, wherein before the generating a first cause value through a radio resource control (RRC) layer, the method further comprises:
   detecting an RRC state of the UE; and
   generating, when the UE is in a connected state or an inactive state, the first cause value through the RRC layer.

4. The method according to claim 1, wherein the encapsulating the first cause value in an RRC dedicated signaling comprises:
   providing an information element (IE) additionally in the RRC dedicated signaling; and
   filling the first cause value into the additionally provided IE, wherein the additionally provided IE is independent of an IE where the second cause value provided by the NAS layer is located.

5. A user equipment (UE), comprising: a first network interface, a first memory, and a first processor; wherein,
   the first network interface is configured to receive and send signals during a process of transceiving information with another external network elements;
   the first memory is configured to store a computer program capable of running on the first processor; and
   the first processor, when running the computer program, is configured to:
   generate a first cause value through a radio resource control (RRC) layer;
   encapsulate the first cause value in an RRC dedicated signaling; and
   send the RRC dedicated signaling and encapsulated with the first cause value to a network side device, wherein the RRC dedicated signaling is used by the network side device for access control.

6. The UE according to claim 5, wherein the first processor is further configured to:
   detect whether there is a second cause value provided by a non-access stratum (NAS) in the RRC dedicated signaling; and
   generate, when there is no second cause value in the RRC dedicated signaling, the first cause value through the RRC layer.

7. The UE according to claim 5, wherein the first processor is further configured to:
   detect an RRC state of the UE; and
   generate, when the UE is in a connected state or an inactive state, the first cause value through the RRC layer.

8. The UE according to claim 5, wherein the first processor is further configured to:
   provide an information element (IE) additionally in the RRC dedicated signaling; and
   fill the first cause value into the additionally provided IE, wherein the additionally provided IE is independent of an IE where the second cause value provided by the NAS layer is located.

9. A non-transitory computer-readable medium storing a program for access control, the program for access control, when executed by at least one processor, implements:
   generating a first cause value through a radio resource control (RRC) layer;
   encapsulating the first cause value in an RRC dedicated signaling; and
   sending the RRC dedicated signaling and encapsulated with the first cause value to a network side device, wherein the RRC dedicated signaling is used by the network side device for access control.

10. The non-transitory computer-readable medium according to claim 9, wherein before the generating a first cause value through a radio resource control (RRC) layer, the program further implements:
    detecting whether there is a second cause value provided by a non-access stratum (NAS) in the RRC dedicated signaling; and
    generating, when there is no second cause value in the RRC dedicated signaling, the first cause value through the RRC layer.

11. The non-transitory computer-readable medium according to claim 9, wherein before the generating a first cause value through a radio resource control (RRC) layer, the program further implements:
    detecting an RRC state of the UE; and
    generating, when the UE is in a connected state or an inactive state, the first cause value through the RRC layer.

12. The non-transitory computer-readable medium according to claim 9, wherein the encapsulating the first cause value in an RRC dedicated signaling comprises:
- providing an information element (IE) additionally in the RRC dedicated signaling; and
- filling the first cause value into the additionally provided IE, wherein the additionally provided IE is independent of an IE where the second cause value provided by the NAS layer is located.

\* \* \* \* \*